United States Patent [19]
Waldo et al.

[11] Patent Number: 5,815,709
[45] Date of Patent: Sep. 29, 1998

[54] SYSTEM AND METHOD FOR GENERATING IDENTIFIERS FOR UNIQUELY IDENTIFYING OBJECT TYPES FOR OBJECTS USED IN PROCESSING OF OBJECT-ORIENTED PROGRAMS AND THE LIKE

[75] Inventors: James H. Waldo, Dracut, Mass.; Krishna Bharat, Atlanta, Ga.; Roger Riggs, Burlington, Mass.

[73] Assignee: San Microsystems, Inc., Palo Alto, Calif.

[21] Appl. No.: 636,707

[22] Filed: Apr. 23, 1996

[51] Int. Cl.⁶ .................................................... G06F 7/00
[52] U.S. Cl. ............................................ 395/683; 707/103
[58] Field of Search .............................. 395/683; 707/103

[56] References Cited

U.S. PATENT DOCUMENTS

| | | | |
|---|---|---|---|
| 5,265,206 | 11/1993 | Shackelford et al. | 395/683 |
| 5,339,435 | 8/1994 | Lubkin et al. | 395/712 |
| 5,737,599 | 4/1998 | Rowe et al. | 707/104 |

*Primary Examiner*—Parshotam S. Lall
*Assistant Examiner*—Kenneth R. Coulter
*Attorney, Agent, or Firm*—Richard A. Jordan

[57] ABSTRACT

A fingerprint generating system generates a fingerprint value for an object in an object-oriented programming arrangement. The object comprises a digital information stream and the fingerprint generating system generates a fixed-length fingerprint value from the digital information stream. The fingerprint generating system receives the digital information stream comprising the object and processes the digital information stream in accordance with a selected hash value generating algorithm to generate a hash value which comprises the fingerprint value. The hash value generating algorithm is selected from a class of hash value generating algorithms characterized in that:

i. in response to said input digital information stream, a digital hash value having a predetermined number of digital bits will be generated as an output;
  ii. the digital hash value will be a function of the digital information stream, so that
     (a) given two input streams that are identical, identical digital hash values will be generated; but
     (b) given two input streams that are not identical, it is extremely unlikely that identical digital hash values will be generated; and
  iii. when the object, as a "referencing object," includes a reference to another object, as a referenced object, the input digital information stream of the referencing object can include a fingerprint which had been previously generated for the referenced object, rather than a digital information stream for referenced object itself, the digital hash value generated according to the selected hash value generating algorithm comprising the fingerprint generated by said fingerprint generating system.

39 Claims, 8 Drawing Sheets

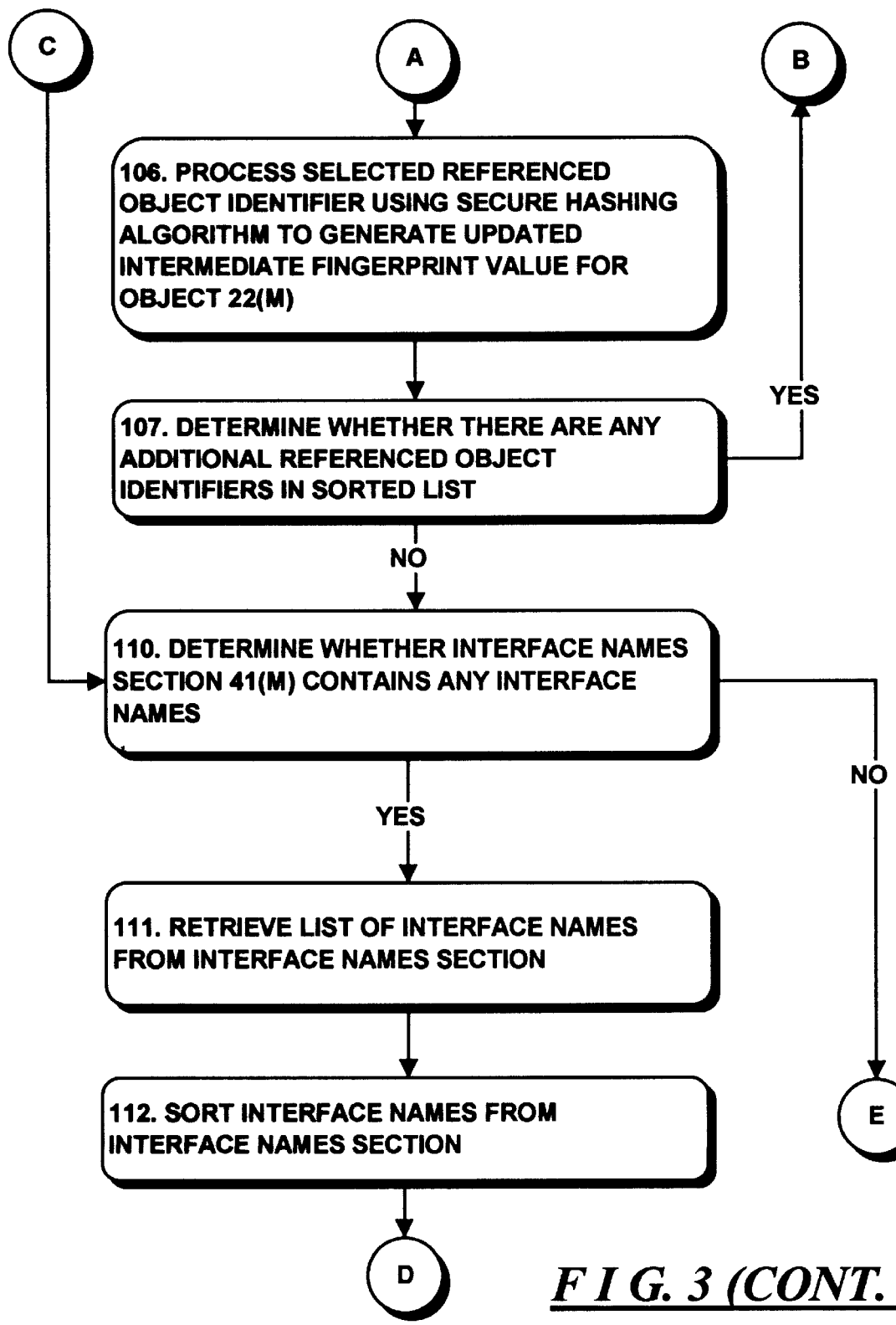
FIG. 3 (CONT. A)

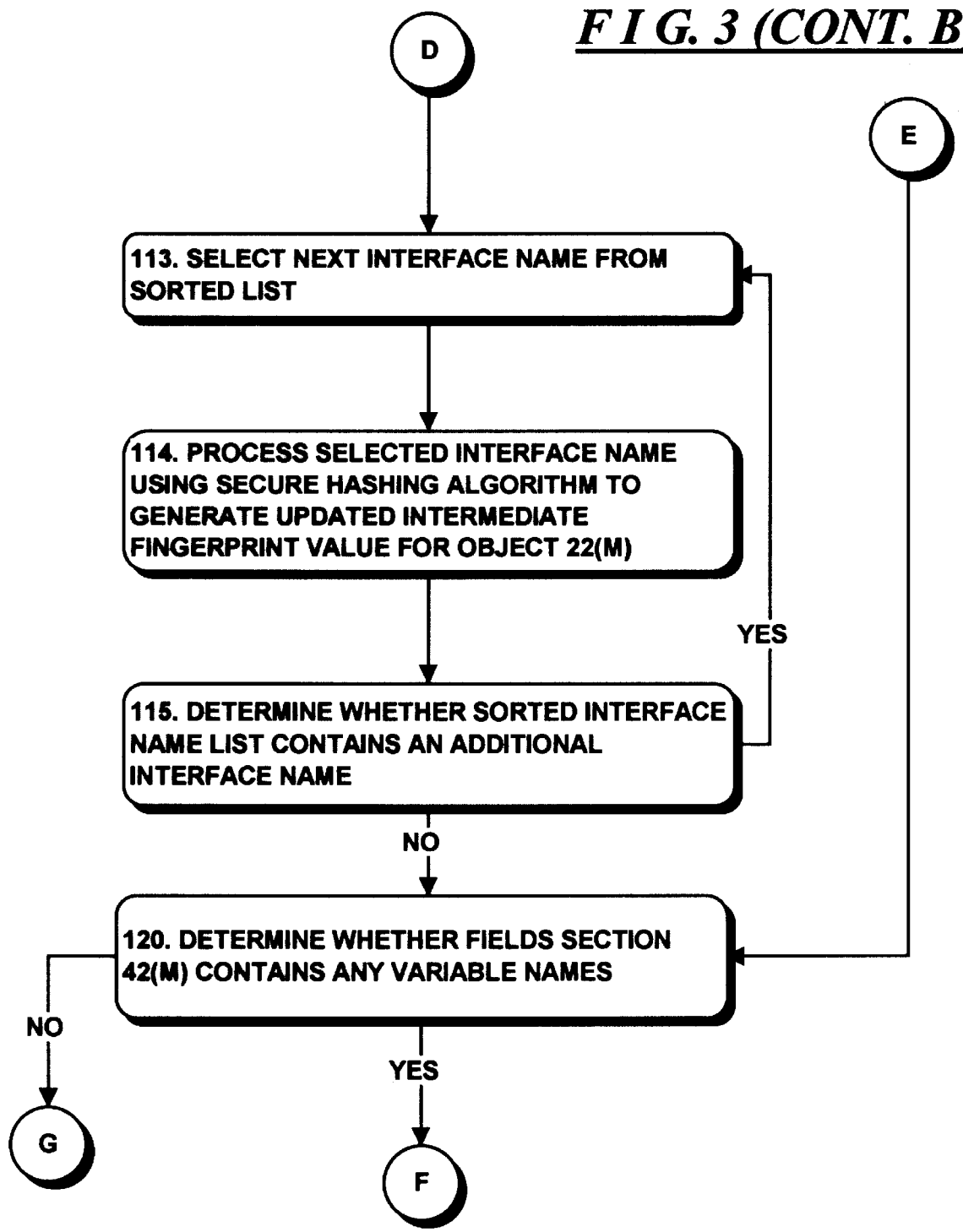
FIG. 3 (CONT. B)

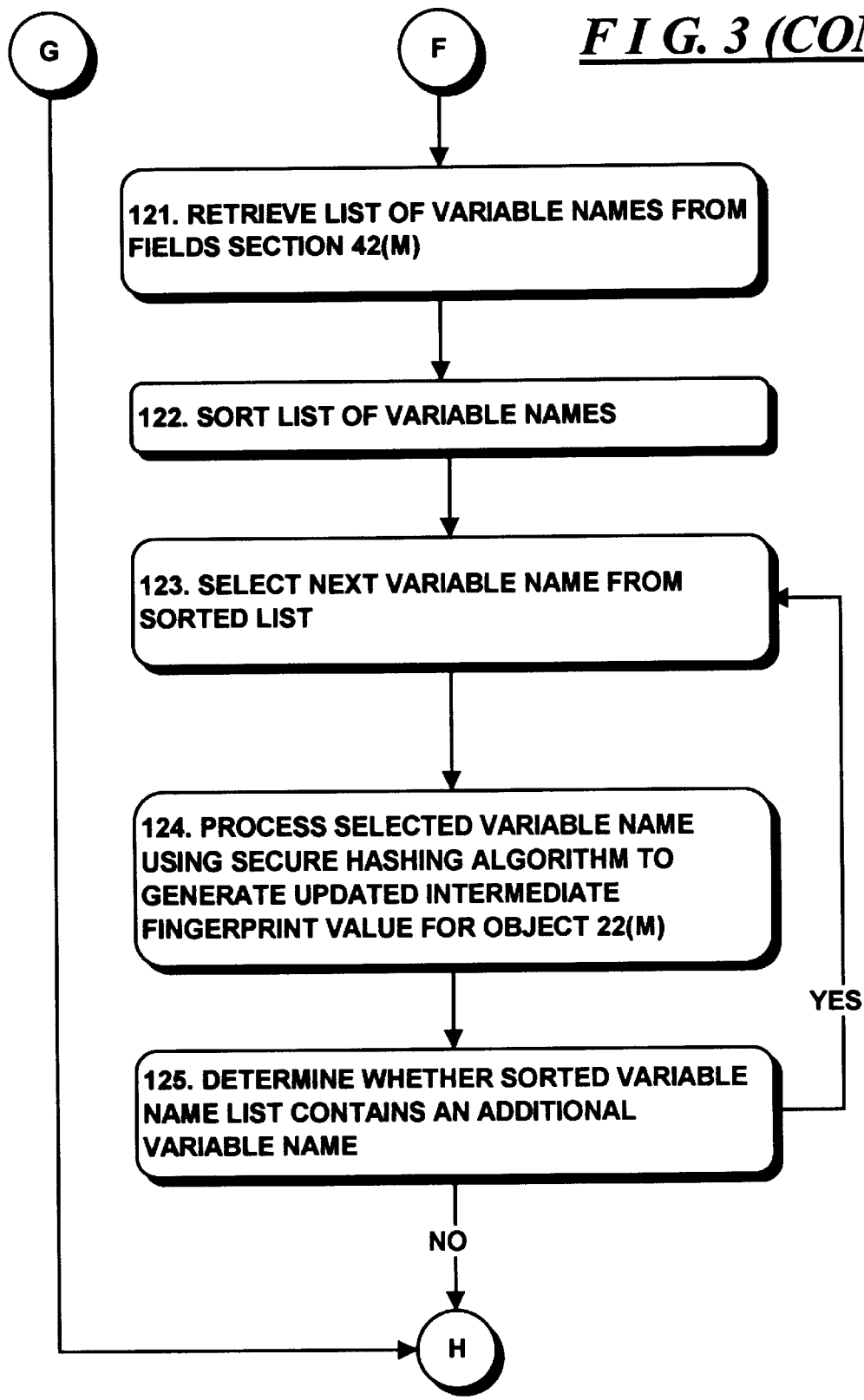
FIG. 3 (CONT. C)

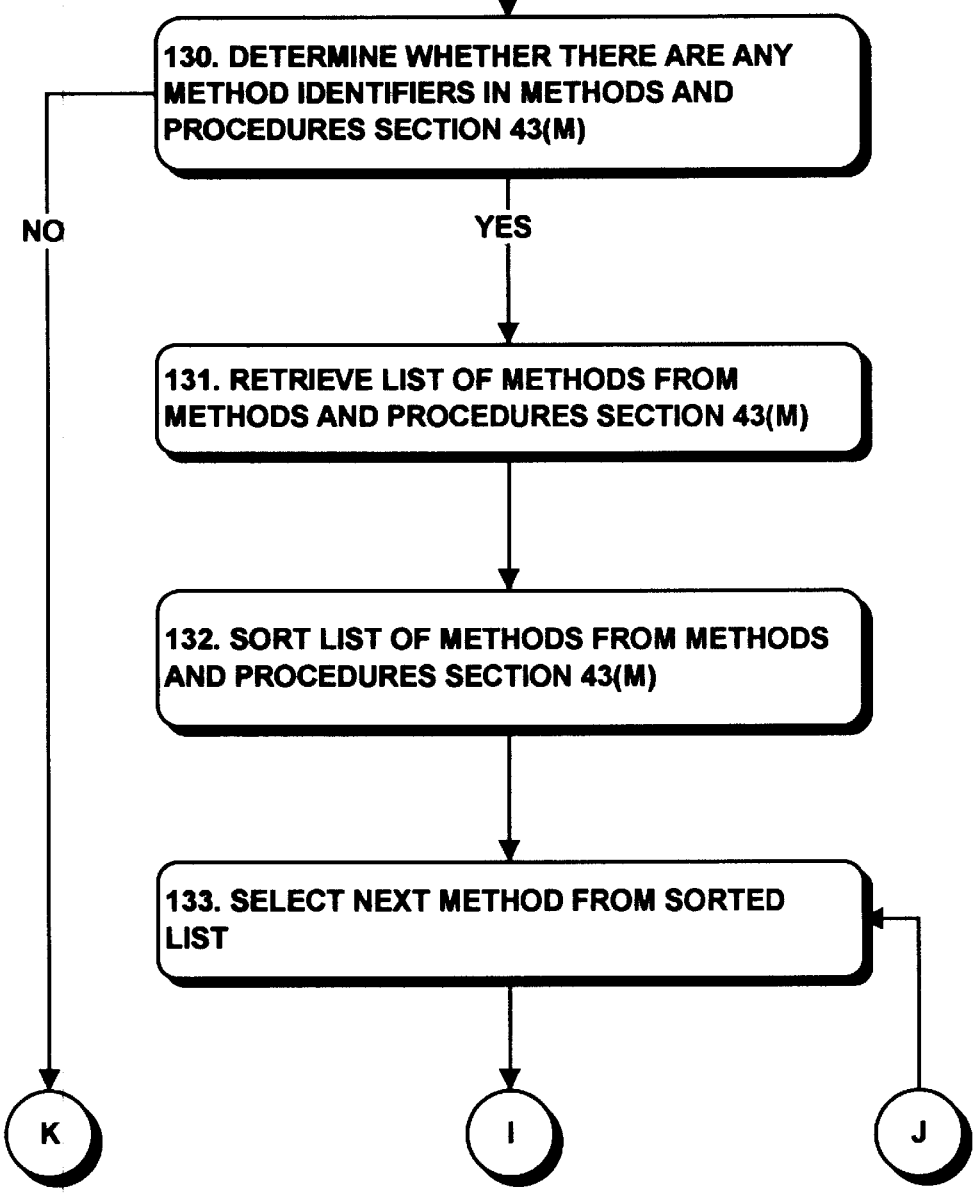
FIG. 3 (CONT. D)

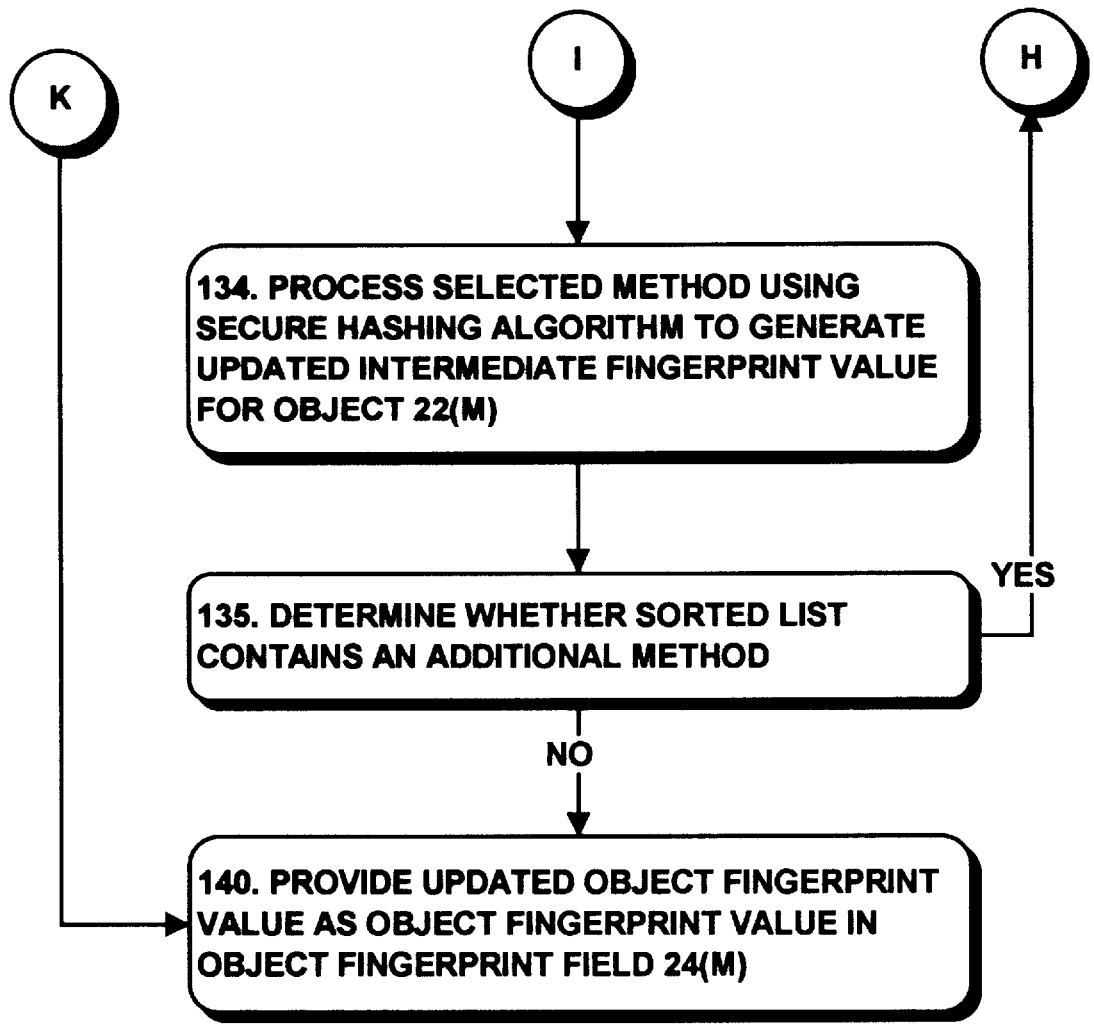
FIG. 3 (CONT. E)

SYSTEM AND METHOD FOR GENERATING IDENTIFIERS FOR UNIQUELY IDENTIFYING OBJECT TYPES FOR OBJECTS USED IN PROCESSING OF OBJECT-ORIENTED PROGRAMS AND THE LIKE

INCORPORATION BY REFERENCE

*The Java™ Language Specification* (Sun Microsystems, Inc., 1993–95), (hereinafter referred to as the "Java language specification") a copy of which is attached hereto as Appendix A, incorporated herein by reference [not to be printed].

*The Java Virtual Machine Specification* (Sun Microsystems, Inc., 1993–95), (hereinafter referred to as the "Java virtual machine specification") a copy of which is attached hereto as Appendix B, incorporated herein by reference [not to be printed].

U.S. patent appn. Ser. No. 08/636,706, filed on even date herewith in the names of Ann M. Wollrath, et al., entitled "System and Method for Facilitating Dynamic Loading of "Stub" Information to Enable a Program Operating in One Address Space to Invoke Processing of a Remote Method or Procedure in Another Address Space" (hereinafter referred to as "the Wollrath, et al., patent application), incorporated herein by reference.

FIELD OF THE INVENTION

The invention is directed generally to the field of systems and methods for use in a computer system or the like that processes programs designed according to object-oriented programming techniques and the like, and more particularly to the field of systems and methods for generating an identifier for uniquely identifying types for objects that are to be used in processing of such programs.

BACKGROUND OF THE INVENTION

In computer programs developed using object-oriented programming techniques, typically "objects" are developed which may be used in processing of a program. Typically, objects may comprise elements such as groups of data, such as arrays or the like, program code defining procedures and methods, and so forth. In one object-oriented computer programming language, namely, the Java™ programming language described in the aforementioned Java language specification, programs define "classes" and "interfaces." Classes are used to define one or more methods or procedures, each of which may be invoked by reference to an interface. An interface provides a mechanism by which a set of methods may be declared, in particular identifying each method, types of arguments that are used in processing the method, the data type(s) of values that are returned by the method, and identifiers for exceptions which may be generated during processing of the method. A class may declare the particular set of interfaces that it implements, that is, the interfaces for whose methods it includes programming code. Alternatively, a class may indicate that it implements a particular interface which may be declared elsewhere. Different classes may indicate that they implement the same interface, and each will have the program code which will be used in processing all of the methods which are declared in the interface. The program code that is provided in each of the classes may differ from the program code provided in the other classes, but the program code for corresponding methods will provide the same results.

When a Java program requires processing services which may be provided by a method that is maintained by a class, an instance of the class may be loaded into its execution environment, or it may invoke a remote execution of the method as described in the Wollrath, et al., patent application. In either case, the object will need to be loaded into the execution environment, either the object comprising the class instance itself, or, in the case of instances of classes that support remote interfaces, a stub class instance that enables the remote invocation of a method. These objects may have been (and in the case of stub class instances, are likely to have been) generated separately from and independently of the program which will be using them. When the program loads an object, it (the program) receives a stream of information which it will need to process to reconstruct the object and its various components, including, for example, the interfaces that are declared by the class as well as the program code which comprises the implementations of the class's respective methods. Typically, classes have identifiers such as object names, but those identifiers are typically assigned by program developers and thus may not be unique. Thus, two classes which have the same name may have very different structures, and thus different methodologies will be needed to reconstruct the class. In addition, over time the structure of a class having a particular name may change, requiring changes to the methodologies needed to reconstruct the class. Accordingly, a program cannot necessarily rely on identifiers such as names provided by program developers to determine which methodologies to be used in reconstructing the class.

SUMMARY OF THE INVENTION

The invention provides a new and improved system and method for generating "fingerprint" identifiers for uniquely identifying types of objects, such as classes which are used in processing of object-oriented programs and the like. The invention particularly provides a system and method for generating fingerprint identifiers which are generated using the actual structures and contents of the respective classes, so that classes which have different structures and contents will have different fingerprint identifiers.

In brief summary, the invention provides a new fingerprint generating system, method and computer program product, for generating a fingerprint value for an object in an object-oriented programming arrangement. The object comprises a digital information stream and the fingerprint generating system generates a fixed-length fingerprint value from the digital information stream. The digital information stream comprising the object is processed in accordance with a selected hash value generating algorithm to generate a hash value which comprises the fingerprint value. The hash value generating algorithm is selected from a class of hash value generating algorithms characterized in that:

i. in response to said input digital information stream, a digital hash value having a predetermined number of digital bits will be generated as an output;

ii. the digital hash value will be a function of the digital information stream, so that
  (a) given two input streams that are identical, identical digital hash values will be generated; but
  (b) given two input streams that are not identical, it is extremely unlikely that identical digital hash values will be generated; and iii. when the object, as a "referencing object," includes a reference to another object, as a referenced object, the input digital information stream of the referencing object need only include a fingerprint which had been previously generated for the referenced object, rather than a digital information stream for referenced object itself, the digital hash value generated according to the selected hash value generating algorithm comprising the fingerprint generated by said fingerprint generating system.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
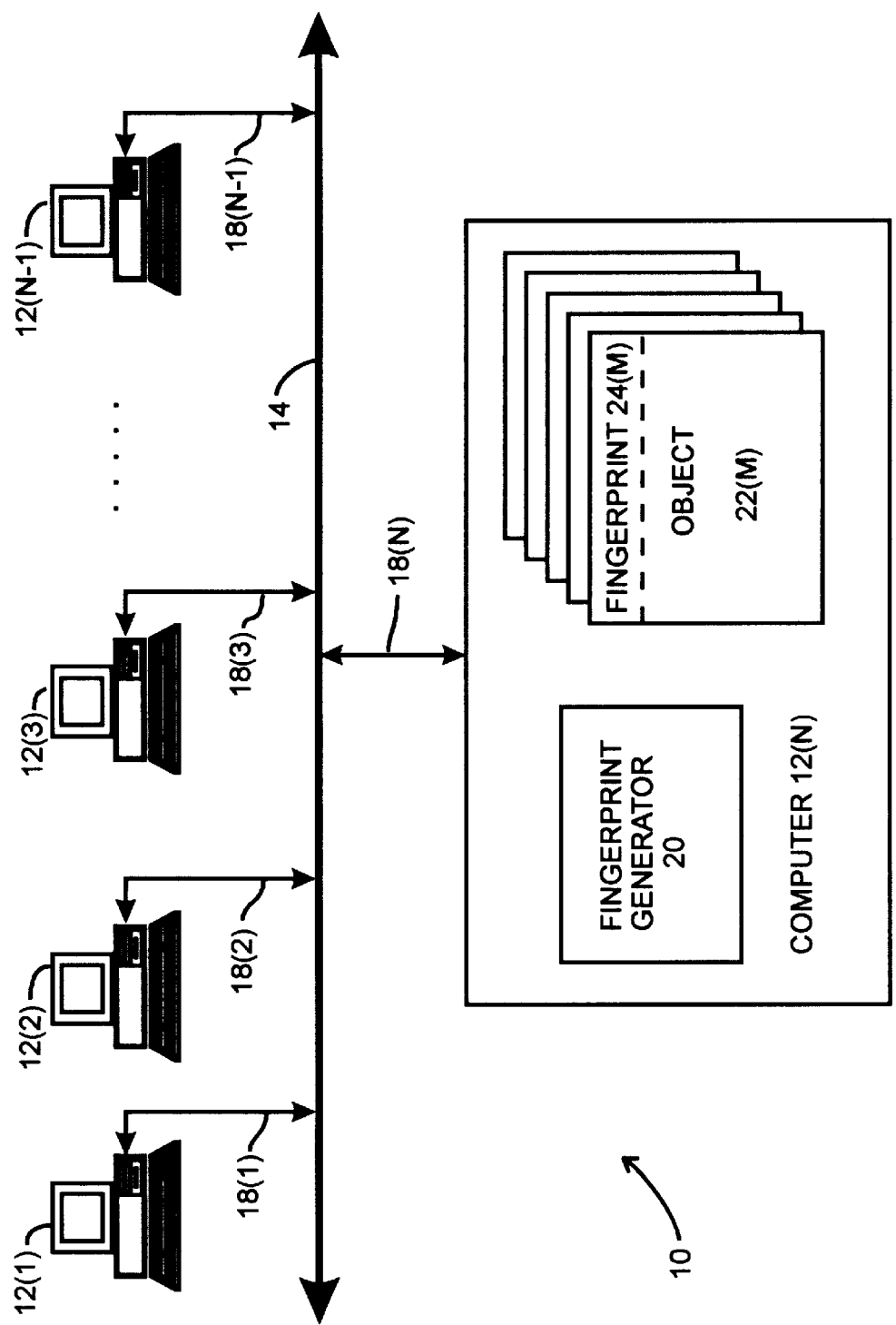
FIG. 1 is a functional block diagram of a computer arrangement including an object type identification generating system constructed in accordance with the invention.

FIG. 1 is a functional block diagram of a computer arrangement 10 including an object type identification generating system constructed in accordance with the invention. With reference to FIG. 1, computer network 10 includes a plurality of computers 12(1) through 12(N) (generally identified by reference numeral 12($n$)) interconnected by a communication link 14. As is conventional, at least some of the computers 12($n$) are in the form of personal computers or computer workstations, each of which includes a system unit, a video display unit and operator input devices such as a keyboard and mouse. The computers 12($n$) are of the conventional stored-program computer architecture. A system unit generally includes processing, memory, and mass storage devices such as disk and/or tape storage elements and other elements (not separately shown), including network interface devices 18($n$) for interfacing the computer to the communication link 14. A video display unit permits the computer to display processed data and processing status to the user, and an operator input device enables the user to input data and control processing by the computer. The computers 12($n$) transfer information, in the form of messages, through their respective network interface devices 18($n$), among each other over the communication link 14.

In one embodiment, the network 10 may be organized in a "client-server" configuration, in which various ones of the computers operate as clients and servers. In one aspect, server computers may, as "file servers," include large-capacity mass storage devices which can store copies of programs and data which are available for retrieval by client computers over the communication link 14 for use in their process operations. From time to time, a client computer may also store data on the server computer, which may be later retrieved by it (that is, the client computer that stored the data) or other clients for use in their processing operations. In addition, one or more of the server computers may, as "compute servers," perform certain processing operations in response to a remote request therefor from a client, and return the results of the processing to the requesting client for use by it (that is, the requesting client computer) in its subsequent processing. In either case, the server computers may be generally similar to the client computers including a system unit, video display unit and operator input devices and may be usable by an operator for data processing operations in a manner similar to a client computer, indeed, in such an arrangement, the "client/server" relationship may be considered to be relative, since computers which operate as servers, in that they perform storage and/or processing operations for other computers, may also operate as clients in requesting storage and processing operations for other computers, including computers for which they operate as servers. Alternatively, some of the server computers may include only processing, memory, mass storage and network interface elements for receiving and processing retrieval, storage or remote processing requests from the client computers, and generating responses thereto.

The communication link 14 interconnecting the client computers 12($n$) in the network 10 may, as is conventional, comprise wires, optical fibers or other media for carrying signals representing information among the computers 12($n$). In addition, the communication link identified by reference numeral 14 may comprise a public network such as the public telephony system and/or the Internet, over which a person using a computer 12($n$) may access information, including programs and data, from a server computer 16 which may be located some distance from the client computer 12($n$). As noted above, each of the computers 12($n$) typically includes a network interface device (represented by respective arrows 18($n$)), which is appropriate to connect the respective computer to the communications link 14.

The invention provides a system for facilitating generation of identifiers, termed herein "fingerprints," for uniquely identifying object "types" for objects that are used in processing of object-oriented programs and the like. The invention will be described in connection with programs provided in the Java™ programming language, as described in the Java language specification, which are processed in connection with an execution environment which is provided by a Java virtual machine. The Java virtual machine, in turn, is specified in the Java virtual machine specification. By way of background, as described in the Java language specification, programs in the Java programming language define "classes" and "interfaces." Classes are used to define one or more methods or procedures, each of which may be invoked by reference to an interface. A class may be associated with and extend a "super-class," and in that regard will incorporate all of the interfaces and methods of the super-class, and may also include additional interfaces and/or methods. A class may also have one or more sub-classes (and thus will comprise a super-class of each of its sub-classes), with each sub-class incorporating and possibly extending their respective super-classes. A class may also reference other objects, including other interfaces and classes, which may be invoked when the methods implemented by the class are processed.

An interface provides a mechanism by which a set of methods may be declared. In that connection, an interface identifies each method that is declared by the interface by, for example, a method name, identifies the data types of arguments that are to be provided for the method, the data type(s) of return values that are to be returned by the method, and identifiers for exceptions which can be thrown during processing of the method. A class may itself declare the particular set of interfaces that it implements, or it may indicate that it implements a particular interface which may be declared elsewhere, and in either connection will include the program code which will be used in processing all of the methods which are declared in the interface. Different classes may indicate that they implement the same interface, and each will have the program code which will be used in processing all of the methods which are declared in the interface. The program code that is provided in each of the classes may differ from the program code provided in the other classes, but the program code for corresponding methods will provide the same results. An interface may be declared independently of the particular class which implements the method or methods which can be invoked using the interface, and in that regard, a class that invokes the method and a class that actually implements the method will not need to share a common super-class. Thus, an interface provides a mechanism by which a set of methods can be declared without providing an indication of the procedures which will be used in processing any of the methods.

As indicated above, the invention provides a system for facilitating generation of fingerprints for uniquely identifying different objects that may be used in processing of object-oriented programs and the like. In programs generated using the Java programming language, a variety of categories of program elements can comprise objects; of particular significance to the instant invention, classes which have been instantiated for use in processing can comprise objects, and the invention provides an arrangement which will generate a unique identifier, or "fingerprint," for each class which can be used by, for example, an execution environment in which a Java program is being processed, to identify the object and facilitate the object's reconstruction when the object is loaded in the execution environment. A fingerprint for the class's "type" may be used for a number of purposes. For example, the fingerprint may be used by the program executing in the execution environment to identify the correct class to be used in processing, either to be, for example, retrieved from the same computer system or another computer system connected to the network 10 and loaded into the execution environment for local processing, or to be used in a invoking remote processing of a method maintained by a class in the same computer system or in another computer system connected to the network 10 as described in the Wollrath, et al., patent application.

In addition, the fingerprint may be used to assist in loading a class instance into the execution environment. Typically, when an object such as a class instance is loaded into an execution environment, the object is received as a stream of information, and the execution environment will need to relate the various portions of the information stream to the various components of the class instance thereby to reconstruct the class instance from the information stream. The execution environment will have available to it resources, such as programming code, which will enable it (that is, the execution environment) to receive the information stream and reconstruct the class instance. Since the structures of the various objects which may be so retrieved are likely to be unique, the execution environment will need to ensure that it (that is, the execution environment) has the proper programming code to enable the object to be reconstructed when the information stream is received. As will be described below, according to the inventive system and method, the fingerprint is generated based on the structure and content of the actual object, and so the execution environment will be able to use the fingerprint of the object to associate the object being loaded with the programming code which can be used to reconstruct the object. Since the fingerprint is based on the object's structure, two objects which have different structures will likely have different fingerprints, even if other identifiers which are associated with the objects, such as object names which may be provided by, for example, program developers, are the same.

A further complication arises because a class, and hence its instantiation, may reference other "referenced" classes which contain methods which the referring class may use in its processing. In that case, the fingerprint for the class will need to reflect not only the various components of the class itself, but also the referenced classes which are referenced by the class.

With this background, and with reference again to FIG. 1, the invention provides a fingerprint generator 20 for use in connection with the one or more of the computers 12($n$) which maintain or use the various objects 22($m$) to generate a respective fingerprint 24($m$) for each of the objects. The fingerprint generator 20 can process each of the objects 22($m$), in a manner which is described below in connection with FIGS. 2 and 3, to generate the fingerprint 24($m$). The fingerprint 24($m$) of the retrieved object represents a value which is used as a fingerprint to identify the "type" of the object, which may be used to identify the object 22($m$) as being of a type which is to be used by a program that is processed by the computer system 12(N) which maintains the object 22($m$), or as being of a type required by a program being processed by another computer system 12(1) through 12(N−1). If the object 22($m$) is of a type that is required by a program being processed by another computer system 12(1) through 12(N−1), the computer system 12(N) may either download the object 22($m$) over the communication link 14 to the other computer system 12(1) through 12(N−1) for use in its (that is, the other computer system's) processing, or it may perform processing of the object itself in a remote method invocation operation as described in the aforementioned Wollrath, et al., application. In any case, the fingerprint 24($m$) will serve to uniquely identify the object's type, effectively ensuring that the object provides the method(s), input data type(s) and return data type(s) that are required by the program, and that the execution environment which loads the object can correctly reconstruct the object from the information stream that it receives when the object is received.

Figure 2:
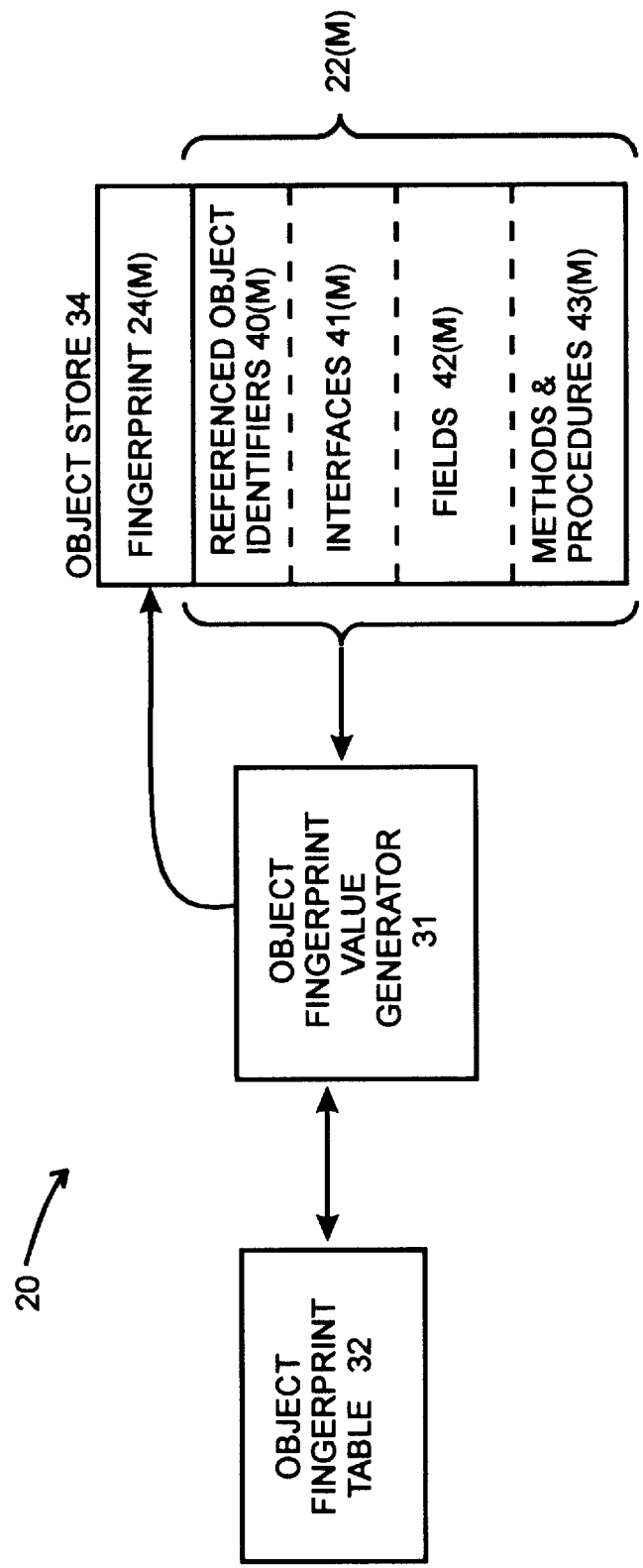
FIG. 2 is a functional block diagram of the object verification system useful in the arrangement depicted in FIG. 1.

As indicated above, the client computer 12($n$) includes a fingerprint generator 20, which will be described in connection with FIG. 2, for generating the fingerprint 24($m$). With reference to FIG. 2, the verifier 20 includes a object fingerprint value generator 31, an object fingerprint table 32, and an object store 34. The object store 34 receives the binary encoding of the object 22($m$) along with the object's fingerprint 23($m$). The object fingerprint value generator 31 processes the contents of the object 22($m$), and referenced objects (not shown in the FIGs.), as numerical digital data, to generate an object fingerprint value. Referenced objects are objects which are referenced in the object in store 34, that is, the references to other classes which are referenced in the class associated with the object in store 34. In generating the object fingerprint value, if the object fingerprint value generator 31 has previously generated an object fingerprint value for a referenced object and stored it in the object fingerprint table 32, it (the object fingerprint value generator 31) may use the previously-generated object fingerprint information for the referenced object in generating the object fingerprint value for the object in the object store 34; otherwise, if another object is referenced by the object in store 34, the fingerprint generator 20 will need to generate a value for that other object in order to generate a fingerprint for the object currently in object store 34.

As described above, the object fingerprint value generator 31 processes the copy of the object 22($m$) in the object store 34 to generate the object fingerprint value which it provides to the comparator 33. In one particular embodiment, the object fingerprint value generator 31 processes the object 22($m$) using a conventional secure hashing algorithm.

Secure hashing algorithms useful with the object fingerprint value generator 31 have characteristics such as:

1) When the algorithm is performed, from a stream of digital information is received as an input, a fixed size digital value (that, is, a predetermined fixed number of data bits or bytes) is generated as an output;

2) The digital output value is a function of the input information, so that
   (a) given two input streams that are identical, identical digital output values will be generated; but
   (b) given two input streams that are not identical, it is extremely unlikely that identical digital output values will be generated;

3) it is extremely unlikely that the input stream can be reproduced from the digital output value; and 4) when an object (as a "referencing object") includes a reference to another object, the input stream for the referencing object need only include the fingerprint which had been previously generated for the referenced object, rather than requiring the referenced object itself.

These characteristics (particularly characteristics 2(a) and (b)) will ensure that, (a) if the fingerprints 23(m) generated by the fingerprint generator 20 for two objects 22(m) have the same value, they will be of the same type, and provide the same set of method(s), requiring the same input data type(s) and providing the same result(s) of the same data type(s), and can be reconstructed using the same reconstruction programming code; but (b) if the fingerprints 24(m) generated by the fingerprint generator 20 for two objects 22(m) have different values, they will be of different types, and thus may not provide the same set of method(s), or may require differing input data type(s), or may result(s) with differing result data type(s), and in any case will likely have different structures.

in which case a program may rely on the objects' fingerprints to uniquely identify the object. Secure hashing algorithms such as the NIST SHA available from the National Institute of Science and Technology, the RC4 and RC5 Secure Hash Algorithms available from RSA, Inc., and the like, are illustrative of secure hashing algorithms which have these characteristics.

Operations performed by the fingerprint generator 20 generating the fingerprint will be described in connection with the flow chart in FIG. 3. Before proceeding further, however, it would be helpful to describe the structure of an object 22(m) which is processed by the fingerprint generator 20 to generate the object fingerprint value. In one embodiment, an object 20 is in the form of, for example, an instantiated class provided in the Java programming language described in the Java language specification. The object 22(m) includes a plurality of sections, including a referenced object identifier section 40(m), an interfaces section 41(m), a fields section 42(m) and a methods and procedures section 43(m). If the object 22(m) references other objects, the referenced object identifier section 40(m) contains identifiers that identify the other objects, and provides indicators indicating how the other objects may be accessed. If the object does not reference another object, the referenced object identifier section 40(m) may be empty.

The methods and procedures section 43(m) provides the particular methods, procedures, routines and the like (generally identified herein as "methods") which may be invoked through calls to the object. Methods which are provided in section 43(m) may make reference to other objects, which are identified in the referenced object identifier section 40(m). The interfaces section 41(m) effectively includes a listing of the object's interfaces, including, for example, names for the particular methods identified in section 43(m) and parameters which are to be provided in a call to invoke a particular method. A program that is being processed by the client computer 12(n) may use the interface listing in section 41(m) to identify the particular methods which may be invoked through calls to the object 22(m). The fields section 42(m) provides a listing of, for example, variables and other elements which are used in the methods defined in section 43(m), and in addition may indicate whether the variables are, for example, private to the particular object 22(m) or a limited portion thereof, and the like.

With this background, operations performed by the fingerprint generator 20 will be described in connection with the flow chart in FIG. 3. With reference to FIG. 3, the object fingerprint value generator 31 initially determines whether the object fingerprint table 32 already has an object fingerprint value for the identified object (step 100). If the object fingerprint value generator 31 makes a positive determination in step 100, it will use the object fingerprint value in its subsequent processing (step 101).

On the other hand, if the object fingerprint value generator 31 makes a negative determination in step 100, the object fingerprint table 32 does not already have an object fingerprint value for the identified object, and in that case it will proceed to step 102 to begin a procedure to generate an object fingerprint for the object. The object fingerprint value generator 31 generates the object fingerprint in a series of sequences, during each sequence using the secure hash algorithm to iteratively process the information contained in the four sections 40(m) through 43(m) to generate the object fingerprint value for the object 22(m).

Initially in that operation, if the referenced object identifier section 40(m) contains one or more referenced object identifiers, the object fingerprint value generator 31 will process fingerprints for the referenced objects identified in the referenced object identifier section 40(m) in one or more iterations, in each iteration processing the fingerprint for one of the referenced objects. In each iteration, if a previously-generated object fingerprint value is stored for the referenced object in the object fingerprint table 32, the object fingerprint value generator 31 will use the fingerprint from the object fingerprint table 32. On the other hand, if no previously-generated object fingerprint value is stored for the referenced object in the object fingerprint table 32, the object fingerprint value generator 31 will attempt to generate an object fingerprint value for the referenced object, store the object fingerprint value in the object fingerprint table 32, and use it (the object fingerprint value for the referenced object) in generating the object fingerprint value for the object 22(m).

More specifically, the object fingerprint value generator 31 will determine whether the referenced object identifiers section 40(m) contains any referenced object identifiers (step 102) and if so will receive the list of referenced object identifiers from the referenced object identifiers section 40(m) (step 103). The object fingerprint value generator 31 will then place the list in sorted order according to a predetermined sorting scheme (step 104). The referenced object identifiers are sorted by the object fingerprint value generator 31 prior to using them in generating the object fingerprint value to ensure that they (the referenced object identifiers) will be in the same order to ensure that the same fingerprint value will be generated regardless of the point in time at which the fingerprint 24(m) is generated.

Figure 3:
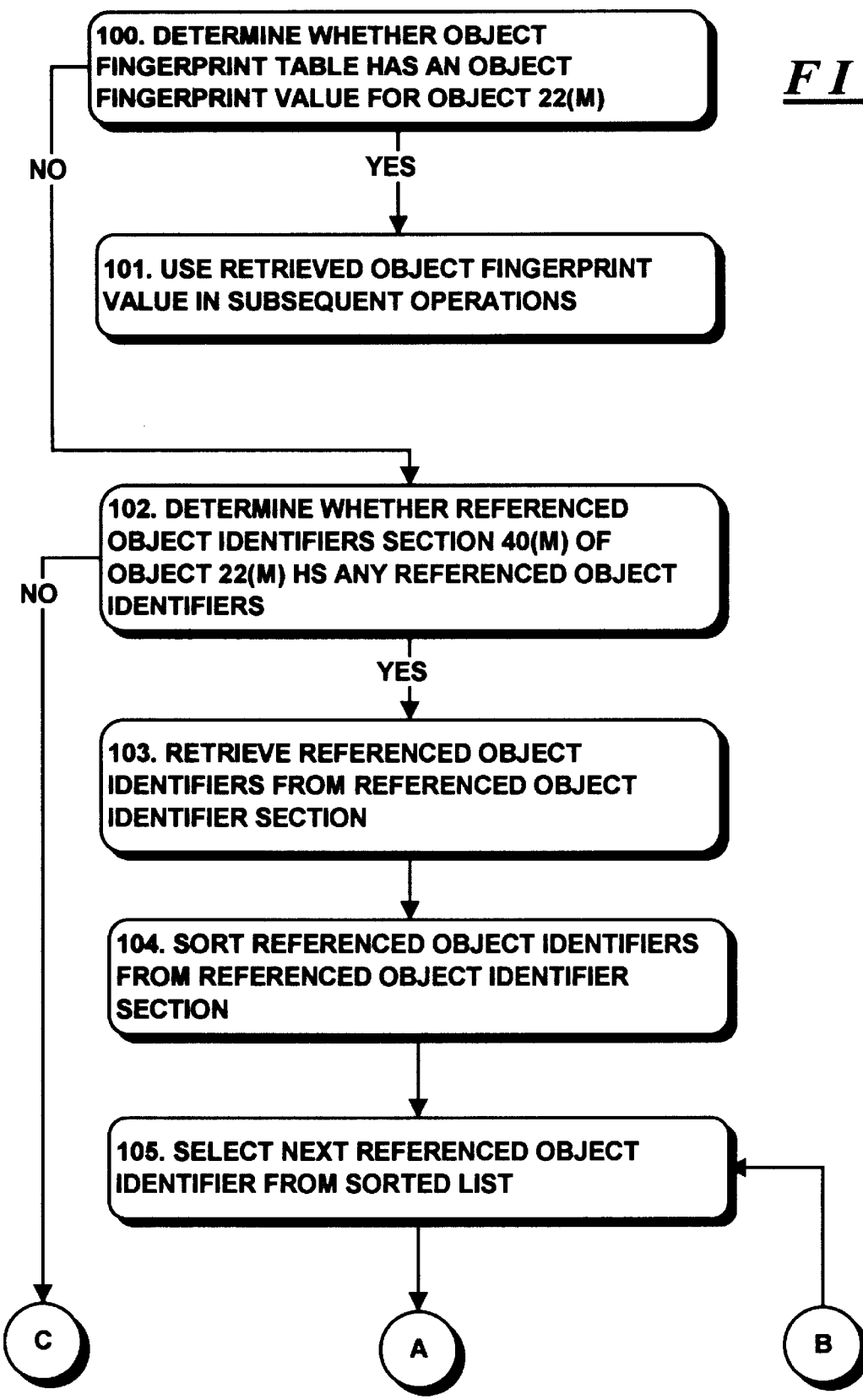
FIGS. 3, 3(CONT. A), 3(CONT. B), 3(CONT. C), 3(CONT. D), and 3(CONT. E) is flow chart useful in understanding the operations of the object verification system depicted in FIG. 2.

After sorting the referenced object identifiers from section 40(m), the object fingerprint value generator 31 will select the "next" referenced object identifier in the sorted list (step 105) and will perform operations depicted in FIG. 3 in connection with the referenced object as identified by the selected referenced object identifier to provide or generate an object fingerprint value for the referenced object. In the first iteration, the object fingerprint value generator 31 will select the first referenced object identifier in the sorted list, and in subsequent iterations (if any) it will select sequentially-listed referenced object identifiers in the sorted list. If the object fingerprint table 32 does not have an object fingerprint value for referenced object identified by selected referenced object identifier, and if the computer 12(n) does not have a copy of the referenced object, it (the computer) may need to retrieve the referenced object from another computer which maintains it (the referenced object). Alternatively, if the computer does not or is unable to retrieve a copy of the referenced object, the object fingerprint value generator 31 may exit.

After generating or retrieving the object fingerprint value for the selected referenced object, the object fingerprint value generator 31 processes the object fingerprint value in connection with secure hashing algorithm to generate an intermediate fingerprint value for the object 22(m) (step 106). Thereafter, the object fingerprint value generator 31 determines whether there are any additional referenced object identifiers in the sorted list (step 107). If the object fingerprint value generator 31 makes a positive determination in step 107, the object fingerprint value generator 31 returns to step 104 to select the next referenced object identifier and process the object fingerprint value of the identified thereby.

Returning to step 102, if the referenced object identifiers section 40(m) is empty, the object fingerprint value generator 31 will make a negative determination in that step. In that case, or if the object fingerprint value generator 31 makes a negative determination in step 107, it will sequence to a series of steps to process interface names which may be listed in the interfaces section 41(m). Initially, the object fingerprint value generator 31 will determine whether the interface names section 40(m) contains any interface names (step 110) and if so will retrieve the list of interface names from the interface names section 40(m) (step 111). The object fingerprint value generator 31 will then place the list in sorted order according to a predetermined sorting scheme (step 112). The interface names are sorted by the object fingerprint value generator 31 prior to using them in generating the object fingerprint value to ensure that they (the interface names) will be in the same order to ensure that the same fingerprint value will be generated regardless of the point in time at which the fingerprint 24(m) is generated.

After sorting the interface names from section 41(m), the object fingerprint value generator 31 will select the "next" interface name in the sorted list (step 113). In the first iteration, the object fingerprint value generator 31 will select the first interface name in the sorted list, and in subsequent iterations (if any) it will select sequentially-listed interface names in the sorted list. The object fingerprint value generator 31 processes the interface name in connection with the secure hashing algorithm to generate an updated intermediate fingerprint value for the object 22(m) (step 114). Thereafter, the object fingerprint value generator 31 determines whether there are any additional interface names in the sorted interface name list (step 115). If the object fingerprint value generator 31 makes a positive determination in step 115, the object fingerprint value generator 31 returns to step 113 to select the next interface name and use it in connection with the secure hash algorithm.

Returning to step 110, if the interface name section 41(m) is empty, the object fingerprint value generator 31 will make a negative determination in that step. In that case, or if the object fingerprint value generator 31 makes a negative determination in step 115, it will sequence to a series of steps to process the variable names which may be listed in the fields section 42(m). Initially, the object fingerprint value generator 31 will determine whether the fields section 42(m) contains any variable names (step 120) and if so will retrieve the list of variable names from the fields section 42(m) (step 121). The object fingerprint value generator 31 will then place the list in sorted order according to a predetermined sorting scheme (step 122). The variable names are sorted by the object fingerprint value generator 31 prior to using them in generating the object fingerprint value to ensure that they (the variable names) will be in the same order to ensure that the same fingerprint value will be generated regardless of the point in time at which the fingerprint 24(m) is generated.

After sorting the variable names from fields section 42(m), the object fingerprint value generator 31 will select the "next" variable name in the sorted list (step 123). In the first iteration, the object fingerprint value generator 31 will select the first variable name in the sorted list, and in subsequent iterations (if any) it will select sequentially-listed variable names in the sorted list. The object fingerprint value generator 31 processes the variable name in connection with secure hashing algorithm to generate an updated intermediate fingerprint value for the object 22(m) (step 124). Thereafter, the object fingerprint value generator 31 determines whether there are any additional variable names in the sorted fields list (step 125). If the object fingerprint value generator 31 makes a positive determination in step 125, the object fingerprint value generator 31 returns to step 123 to select the next variable name and process it in connection with the secure hash algorithm.

Returning to step 120, if the fields section 42(m) is empty, the object fingerprint value generator 31 will make a negative determination in that step. In that case, or if the object fingerprint value generator 31 makes a negative determination in step 125, it will sequence to a series of steps to process the methods which may be listed in the methods and procedures section 43(m). Initially, the object fingerprint value generator 31 will determine whether the methods and procedures section 43(m) contains any methods (step 130) and if so will retrieve the list of methods from the section 43(m) (step 131). The object fingerprint value generator 31 will place the list in sorted order according to a predetermined sorting scheme, sorting using names of the respective methods (step 132). The methods are sorted by the object fingerprint value generator 31 prior to using them in generating the object fingerprint value to ensure that the methods will be in the same order to ensure that the same fingerprint value will be generated regardless of the point in time at which the fingerprint 24(m) is generated, if the ordering of the methods changes.

After sorting the methods from section 43(m), the object fingerprint value generator 31 will select the "next" method in the sorted list (step 133). In the first iteration, the object fingerprint value generator 31 will select the first method in the sorted list, and in subsequent iterations (if any) it will select sequentially-listed methods in the sorted list. The object fingerprint value generator 31 processes the selected method in connection with the secure hashing algorithm to generate an updated intermediate fingerprint value for the object 22(m) (step 134). Thereafter, the object fingerprint value generator 31 determines whether there are any additional methods in the sorted list (step 135). If the object fingerprint value generator 31 makes a positive determination in step 135, the object fingerprint value generator 31 returns to step 123 to select the next method and process it in connection with the secure hash algorithm.

Returning to step 130, if the methods and procedures section 42(m) is empty, the object fingerprint value generator 31 will a negative determination in that step. (This may occur if, for example, the object declares an interface, rather than defining a class.) In that case, or if the object fingerprint value generator 31 makes a negative determination in step 135, it will have processed the entire object 22(m) in connection with the secure hash algorithm, and so the updated intermediate fingerprint value will correspond to the object fingerprint value for the object 22(m). In that case, the object fingerprint value generator 31 will store the object fingerprint value for the object 22(m) in the object fingerprint table 32 (step 140).

The invention provides a number of advantages. In particular, the invention provides an arrangement which enables a client computer 12 to determine, with a high degree of probability, that an object, such as object 22(m), is of a particular type and can be reconstructed used in its processing. The invention accomplishes this by providing for the object 22(m), a fingerprint value that may be used by a program to provide type information to identify objects which it may need in its processing. This can avoid the necessity of using other identifiers, such as object names, which generally need not be unique and in any case may remain the same even though the objects named thereby may change in a manner which may make them not usable by the program.

It will be appreciated that a number of modifications may be made to the arrangement described above in connection with FIGS. 1 through 3. For example, although the arrangement has been described in connection with a plurality of computer systems 12(n) interconnected by a network, it will be appreciated that the arrangement may be used in connection with a computer system to generate fingerprints for objects which may be distributed with programs on, for example, a computer readable medium (such as a magnetic disk or CD-ROM) for processing on a single, stand-alone computer. In addition, although the arrangement has been described in connection with objects having the four sections 40(m) through 43(m) described above in connection with FIG. 2, it will be appreciated that it may be used in connection with objects having different numbers of sections, and indeed different types of sections; of particular significance is that the fingerprint be generated so as to fairly uniquely identify the object's type, that is, the method(s), data type(s) of the input variable(s) and the data type(s) of the output variable(s).

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A fingerprint generating system for use generating a fingerprint value for an object in an object-oriented programming arrangement, the object comprising a digital information stream, the fingerprint generating system comprising:

A. a receiver for receiving the digital information stream comprising the object;

B. an object fingerprint value generator for processing the digital information stream in accordance with a selected hash value generating algorithm, the hash value generating algorithm being selected from a class of hash value generating algorithms characterized in that:

i. in response to said input digital information stream, a digital hash value having a predetermined number of digital bits will be generated as an output;

ii. the digital hash value will be a function of the digital information stream, so that (a) given two input streams that are identical, identical digital hash values will be generated; but (b) given two input streams that are not identical, it is extremely unlikely that identical digital hash values will be generated; and iii. when the object, as a "referencing object," includes a reference to another object, as a referenced object, the object fingerprint value generator can process the input digital information stream of the referencing object including a referenced object fingerprint generated for the referenced object, rather than a digital information stream associated with the referenced object, the digital output value generated according to the selected hash value generating algorithm comprising the fingerprint generated by said fingerprint generating system.

2. A fingerprint generating system as defined in claim 1 in which said hash value generating algorithm is selected from said class of hash value generating algorithms further characterized in that it is extremely unlikely that the digital input stream can be reproduced from the digital output value.

3. A fingerprint generating system as defined in claim 2 in which said object fingerprint value generator processes the digital information stream in accordance with a selected hash value generating algorithm identified as NIST SHA available from the National Institute of Science and Technology.

4. A fingerprint generating system as defined in claim 2 in which said object fingerprint value generator processes the digital information stream in accordance with a selected hash value generating algorithm identified as an RC4 Secure Hash Algorithm available from RSA, Inc.

5. A fingerprint generating system as defined in claim 2 in which said object fingerprint value generator processes the digital information stream in accordance with a selected hash value generating algorithm identified as an RC5 Secure Hash Algorithm available from RSA, Inc.

6. A fingerprint generating system as defined in claim 1 in which said object includes at least one reference to a referenced object, the object fingerprint value generator including:
   A. a referenced object fingerprint availability determination element for determining whether it has a referenced object fingerprint for said referenced object, and
   B. a referenced object processing element responsive to a positive determination by said referenced object fingerprint availability determination element for processing the referenced object fingerprint in accordance with the selected hash value generating algorithm.

7. A fingerprint generating system as defined in claim 6 in which said object fingerprint value generator further includes a referenced object retrieval element for retrieving a referenced object digital information stream for said referenced object in response to a negative determination by said referenced object fingerprint availability determination element, said object fingerprint value generator processing the referenced object digital information stream in accordance with a said selected hash value generating algorithm to generate said referenced object fingerprint.

8. A fingerprint generating system as defined in claim 7 in which the selected hash value generating algorithm used by said object fingerprint value generator to process the referenced object digital information stream comprises the same selected hash value generating algorithm used by the object fingerprint value generator to process the digital information stream.

9. A fingerprint generating system as defined in claim 6 in which said object includes a plurality of references each to respective ones of a plurality of referenced objects, the object fingerprint value generator further comprising a sort element for sorting said references according to a predetermined ordering, the referenced object fingerprint availability determination element and referenced object processing element operating in a series of iterations in connection with the series of references in said ordering.

10. A fingerprint generating system as defined in claim 1 in which said object comprises a plurality of elements, the fingerprint generating system further including a sort element for sorting portions of the digital information stream comprising the respective elements according to a selected sorted ordering to generate a sorted digital information stream, the object fingerprint value generator generating the digital hash value from the sorted digital information stream.

11. A fingerprint generating system as defined in claim 1 in which said object comprises a series of sections, the object fingerprint value generator sequentially processing the respective sections in series.

12. A fingerprint generating system as defined in claim 11 in which each section further comprises a plurality of elements, the fingerprint generating system further including a sort element for sorting portions of the digital information stream within each section comprising the respective elements according to a selected sorted ordering to generate a sorted digital information stream, the object fingerprint value generator generating the digital hash value from the sorted digital information stream.

13. A fingerprint generating method for use generating a fingerprint value for an object in an object-oriented program arrangement, the object comprising a digital information stream, the fingerprint generating method comprising the steps of:
   A. receiving the digital information stream comprising the object;
   B. processing the digital information stream in accordance with a selected hash value generating algorithm, the hash value generating algorithm being selected from a class of hash value generating algorithms characterized in that:
      i. in response to said input digital information stream, a digital hash value having a predetermined number of digital bits will be generated as an output;
      ii. the digital hash value will be a function of the digital information stream, so that
         (a) given two input streams that are identical, identical digital hash values will be generated; but
         (b) given two input streams that are not identical, it is extremely unlikely that identical digital hash values will be generated; and
      iii. when the object, as a "referencing object," includes a reference to another object, as a referenced object, the object fingerprint value generator can process the input digital information stream of the referencing object including a referenced object fingerprint generated for the referenced object, rather than a digital information stream associated with the referenced object,
   the digital output value generated according to the selected hash value generating algorithm comprising the fingerprint.

14. A fingerprint generating method as defined in claim 13 in which said hash value generating algorithm is selected from said class of hash value generating algorithms further characterized in that it is extremely unlikely that the digital input stream can be reproduced from the digital output value.

15. A fingerprint generating method as defined in claim 14 in which, during said object fingerprint value generating step the digital information stream is processed in accordance with a selected hash value generating algorithm identified as NIST SHA available from the National Institute of Science and Technology.

16. A fingerprint generating method as defined in claim 14 in which, during said object fingerprint value generating step, the digital information stream is processed in accordance with a selected hash value generating algorithm identified as an RC4 Secure Hash Algorithm available from RSA, Inc.

17. A fingerprint generating method as defined in claim 14 in which, during said object fingerprint value generating step, the digital information stream is processed in accordance with a selected hash value generating algorithm identified as an RC5 Secure Hash Algorithm available from RSA, Inc.

18. A fingerprint generating method as defined in claim 13 in which said object includes at least one reference to a referenced object, the object fingerprint value generating step including the steps of:
   A. determining whether a referenced object fingerprint is provided for said referenced object, and
   B. responsive to a positive determination during said referenced object fingerprint availability determination step, processing the referenced object fingerprint in accordance with the selected hash value generating algorithm.

19. A fingerprint generating method as defined in claim 18 in which said object fingerprint value generation step further includes the step of retrieving a referenced object digital information stream for said referenced object in response to a negative determination by said referenced object fingerprint availability determination element, and processing the referenced object digital information stream in accordance with a said selected hash value generating algorithm to generate said referenced object fingerprint.

20. A fingerprint generating method as defined in claim 19 in which, during the selected hash value generating step, the same selected hash value generating algorithm is used to process the referenced object digital information stream as is used to process the digital information stream.

21. A fingerprint generating method as defined in claim 18 in which said object includes a plurality of references each to respective ones of a plurality of referenced objects, the object fingerprint value generation step further comprising the step of sorting said references according to a predetermined ordering, the referenced object fingerprint availability determination step and referenced object processing step being performed in a series of iterations in connection with the series of references in said ordering.

22. A fingerprint generating method as defined in claim 13 in which said object comprises a plurality of elements, the fingerprint generating method further including the step of sorting portions of the digital information stream comprising the respective elements according to a selected sorted ordering to generate a sorted digital information stream, the digital hash value being generated from the sorted digital information stream.

23. A fingerprint generating method as defined in claim 13 in which said object comprises a series of sections, the object fingerprint value generation step including the step of sequentially processing the respective sections in series.

24. A fingerprint generating method as defined in claim 23 in which each section further comprises a plurality of elements, the fingerprint generating method further including the step of sorting portions of the digital information stream within each section comprising the respective elements according to a selected sorted ordering to generate a sorted digital information stream, the digital hash value being generated from the sorted digital information stream.

25. A fingerprint generating computer program product for use in controlling a computer to generate a fingerprint value for an object in an object-oriented programming arrangement, the object comprising a digital information stream, the fingerprint generating computer program product comprising a machine-readable medium having encoded thereon:
  A. receiver code devices for enabling said computer to receive the digital information stream comprising the object;
  B. object fingerprint value generator code devices for enabling said computer to process the digital information stream in accordance with a selected hash value generating algorithm, the hash value generating algorithm being selected from a class of hash value generating algorithms characterized in that:
    i. in response to said input digital information stream, a digital hash value having a predetermined number of digital bits will be generated as an output;
    ii. the digital hash value will be a function of the digital information stream, so that
      (a) given two input streams that are identical, identical digital hash values will be generated; but
      (b) given two input streams that are not identical, it is extremely unlikely that identical digital hash values will be generated; and
    iii. when the object, as a "referencing object," includes a reference to another object, as a referenced object, the object fingerprint value generator can process the input digital information stream of the referencing object including a referenced object fingerprint generated for the referenced object, rather than a digital information stream associated with the referenced object, the digital output value generated according to the selected hash value generating algorithm comprising the fingerprint generated by said fingerprint generating system.

26. A fingerprint generating computer program product as defined in claim 25 in which said hash value generating system is selected from said class of hash value generating algorithms further characterized in that it is extremely unlikely that the digital input stream can be reproduced from the digital output value.

27. A fingerprint generating computer program product as defined in claim 26 in which said object fingerprint value generator code devices enable said computer to process the digital information stream in accordance with a selected hash value generating algorithm identified as NIST SHA available from the National Institute of Science and Technology.

28. A fingerprint generating computer program product as defined in claim 26 in which said object fingerprint value generator code devices enable said computer to process the digital information stream in accordance with a selected hash value generating algorithm identified as an RC4 Secure Hash Algorithms available from RSA, Inc.

29. A fingerprint generating computer program product as defined in claim 26 in which said object fingerprint value generator code devices enable said computer to process the digital information stream in accordance with a selected hash value generating algorithm identified as an RC5 Secure Hash Algorithms available from RSA, Inc.

30. A fingerprint generating computer program product as defined in claim 25 in which said object includes at least one reference to a referenced object, the object fingerprint value generator code devices including:
  A. referenced object fingerprint availability determination code devices for enabling said computer to determine whether it has a referenced object fingerprint for said referenced object, and
  B. referenced object processing code devices for enabling said computer, responsive to a positive determination by said referenced object fingerprint availability determination element, to process the referenced object fingerprint in accordance with the selected hash value generating algorithm.

31. A fingerprint generating computer program product as defined in claim 30 in which said object fingerprint value generator code devices further include referenced object retrieval code devices for enabling said computer to retrieve a referenced object digital information stream for said referenced object in response to a negative determination during processing of said referenced object fingerprint availability determination code devices, said object fingerprint value generator code devices processing the referenced object digital information stream in accordance with a said selected hash value generating algorithm to generate said referenced object fingerprint.

32. A fingerprint generating computer program product as defined in claim 31 in which the selected hash value generating algorithm used by during processing of said object fingerprint value generator code devices to process the referenced object digital information stream comprises the same selected hash value generating algorithm used during processing of the object fingerprint value generator code devices to process the digital information stream.

33. A fingerprint generating computer program product as defined in claim 30 in which said object includes a plurality of references each to respective ones of a plurality of referenced objects, the object fingerprint value generator code devices further comprising a sort element for enabling said computer to sort said references according to a predetermined ordering, the referenced object fingerprint availability determination code devices and referenced object processing code devices controlling said computer to operate in a series of iterations in connection with the series of references in said ordering.

34. A fingerprint generating computer program product as defined in claim 25 in which said object comprises a plurality of elements, the fingerprint generating computer program product further including sort code devices for enabling the computer to sort portions of the digital information stream comprising the respective elements according to a selected sorted ordering to generate a sorted digital information stream, the object fingerprint value generator code devices enabling aid computer to generate the digital hash value from the sorted digital information stream.

35. A fingerprint generating computer program product as defined in claim 25 in which said object comprises a series of sections, the object fingerprint value generator code devices enabling said computer to sequentially process the respective sections in series.

36. A fingerprint generating computer program product as defined in claim 35 in which each section further comprises a plurality of elements, the fingerprint generating computer program product further including sort code devices for enabling said computer to sort portions of the digital information stream within each section comprising the respective elements according to a selected sorted ordering to generate a sorted digital information stream, the object fingerprint value generator code devices enabling the computer to generate the digital hash value from the sorted digital information stream.

37. A fingerprint generating system for use generating a fingerprint value for an object in an object-oriented programming arrangement, the object comprising a digital information stream, the fingerprint generating system comprising:
    A. a computer; and
    B. a control arrangement for controlling said computer, the control arrangement comprising:
        i. a receiver module for enabling said computer to receive the digital information stream comprising the object;
        ii. an object fingerprint value generation module for enabling said computer to processes the digital information stream in accordance with a selected hash value generating algorithm, the hash value generating algorithm being selected from a class of hash value generating algorithms characterized in that:
            a. in response to said input digital information stream, a digital hash value having a predetermined number of digital bits will be generated as an output;
            b. the digital hash value will be a function of the digital information stream, so that
                (I) given two input streams that are identical, identical digital hash values will be generated; but
                (II) given two input streams that are not identical, it is extremely unlikely that identical digital hash values will be generated; and
            c. when the object, as a "referencing object," includes a reference to another object, as a referenced object, the object fingerprint value generator can process the input digital information stream of the referencing object including a referenced object fingerprint generated for the referenced object, rather than a digital information stream associated with the referenced object, the digital output value generated according to the selected hash value generating algorithm comprising the fingerprint generated by said fingerprint generating system.

38. A control arrangement for use in connection with a computer to facilitate generation of a fingerprint value for an object in an object-oriented programming arrangement, the object comprising a digital information stream, the control arrangement comprising:
    A. a receiver module for enabling said computer to receive the digital information stream comprising the object;
    B. an object fingerprint value generation module for enabling said computer to processes the digital information stream in accordance with a selected hash value generating algorithm, the hash value generating algorithm being selected from a class of hash value generating algorithms characterized in that:
        i. in response to said input digital information stream, a digital hash value having a predetermined number of digital bits will be generated as an output;
        ii. the digital hash value will be a function of the digital information stream, so that
            (a) given two input streams that are identical, identical digital hash values will be generated; but
            (b) given two input streams that are not identical, it is extremely unlikely that identical digital hash values will be generated; and
        ii. when the object, as a "referencing object," includes a reference to another object, as a referenced object, the object fingerprint value generator can process the input digital information stream of the referencing object including a referenced object fingerprint generated for the referenced object, rather than a digital information stream associated with the referenced object, the digital output value generated according to the selected hash value generating algorithm comprising the fingerprint generated by said fingerprint generating system.

39. A system for distributing code stored on a computer readable medium and executable by a computer, the code including a plurality of modules each configured to control the computer to facilitate generation of a fingerprint value for an object in an object-oriented programming arrangement, the object comprising a digital information stream, the system comprising:
    A. a receiver module for enabling said computer to receive the digital information stream comprising the object;
    B. an object fingerprint value generation module for enabling said computer to processes the digital information stream in accordance with a selected hash value generating algorithm, the hash value generating algorithm being selected from a class of hash value generating algorithms characterized in that:
        i. in response to said input digital information stream, a digital hash value having a predetermined number of digital bits will be generated as an output;
        ii. the digital hash value will be a function of the digital information stream, so that
            (a) given two input streams that are identical, identical digital hash values will be generated; but (b) given two input streams that are not identical, it is extremely unlikely that identical digital hash values will be generated; and ii. when the object, as a "referencing object," includes a reference to another object, as a referenced object, the object fingerprint value generator can process the input digital information stream of the referencing object including a referenced object fingerprint generated for the referenced object, rather than a digital information stream associated with the referenced object, the digital output value generated according to the selected hash value generating algorithm comprising the fingerprint generated by said fingerprint generating system.

* * * * *